March 2, 1954  F. D. HAZEN  2,670,945
INDUSTRIAL HEATING FURNACE
Filed July 20, 1951  2 Sheets-Sheet 1

INVENTOR.
BY Frank D. Hazen
William B. Jaspert
Attorney.

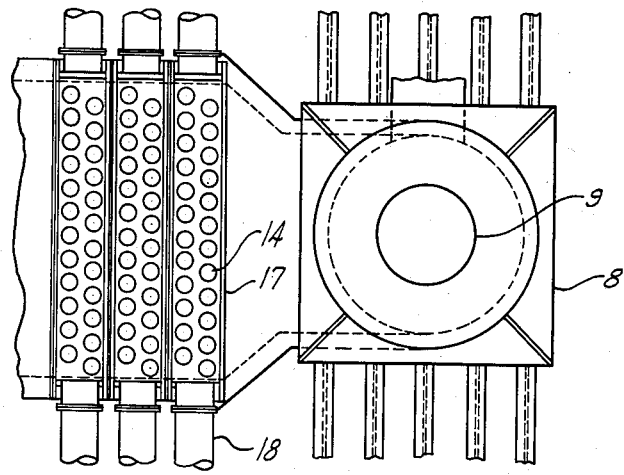
Fig. 2
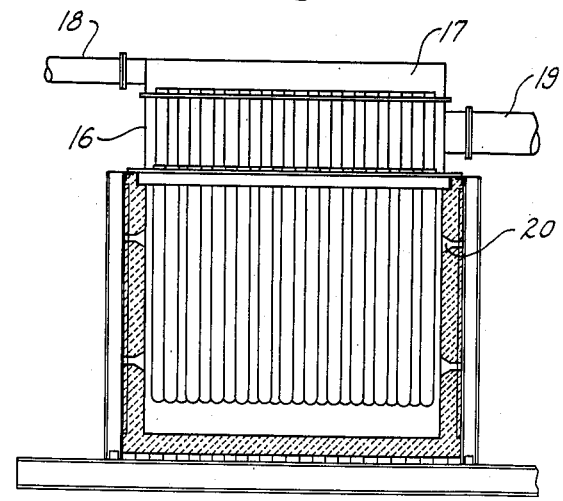
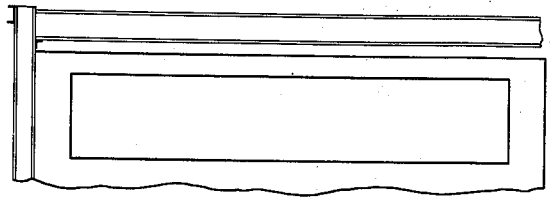
Fig. 3

Patented Mar. 2, 1954

2,670,945

UNITED STATES PATENT OFFICE 2,670,945

INDUSTRIAL HEATING FURNACE

Frank D. Hazen, Pittsburgh, Pa.

Application July 20, 1951, Serial No. 237,788

3 Claims. (Cl. 263—40)

This invention relates to new and useful improvements in industrial heating furnaces, more particularly to industrial heating furnaces of the recuperative type, and it is among the objects thereof to provide a combination continuous heating furnace and recuperator structure in which the recuperator parts are readily accessible for cleaning and maintenance work without requiring a complete cooling of the furnace and recuperator parts, thereby increasing the capacity of such furnaces.

It is a further object of the invention to provide industrial heating furnaces with recuperator structures disposed above the furnace to provide for the natural up-draft of the products of combustion of the furnace to assure maximum efficiency in combustion and uniform heating of the product.

The invention will become more apparent from a consideration of the accompanying drawings, constituting a part hereof, in which like reference characters designate like parts, and in which—

Fig. 2 is a top plan view taken along the line 2—2, Fig. 1; and

Fig. 3 is a vertical cross-sectional view, partially in elevation taken along the line 3—3 of Fig. 1.

Figure 1:
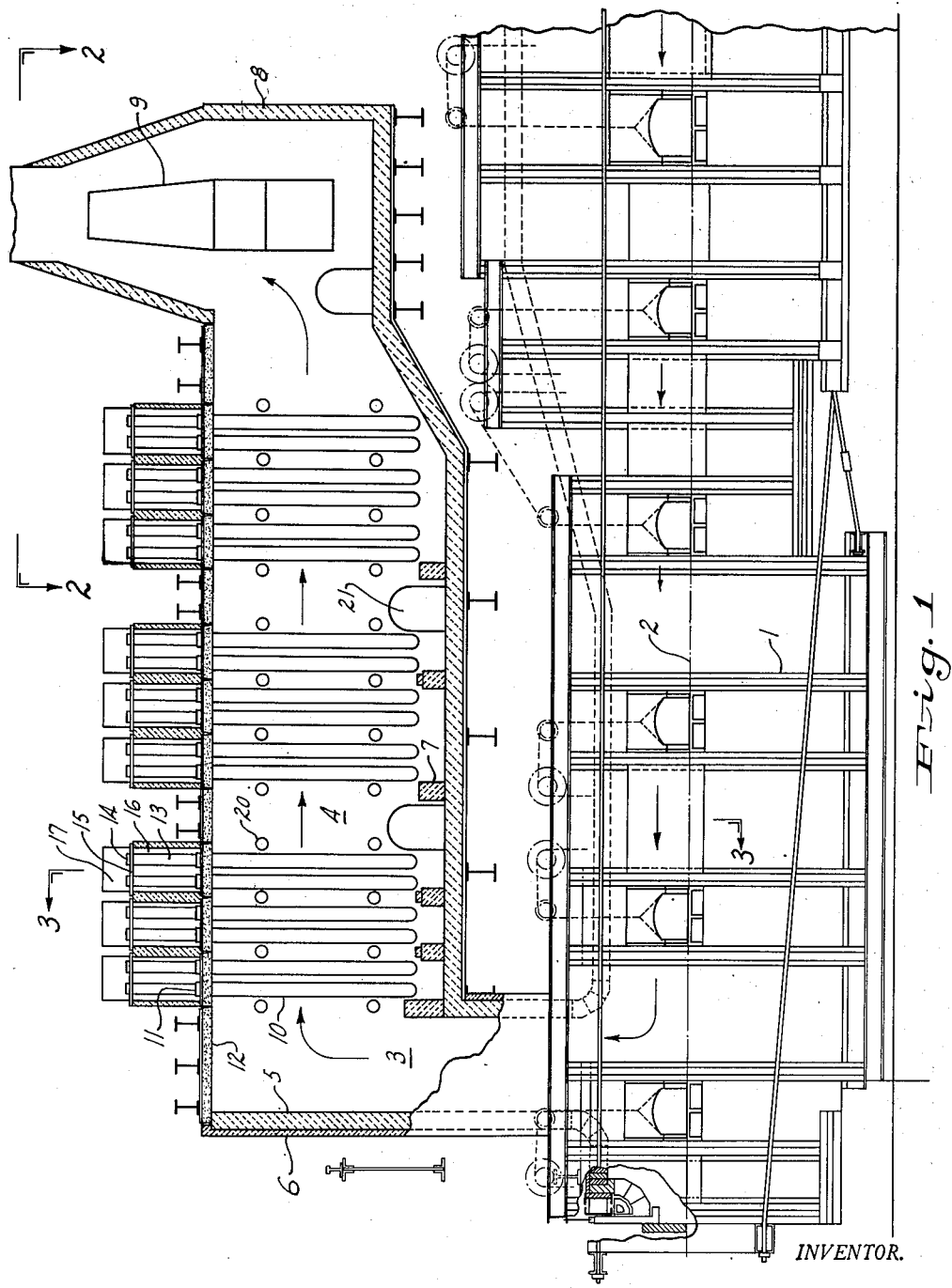
Fig. 1 is a side elevational view, partially in cross-section, of a recuperator furnace structure embodying the principles of this invention.

With reference to the several figures of the drawings, the numeral 1 generally designates the superstructure of the furnace as consisting of I-beams and channels for supporting the refractory walls and roof which constitutes no part of the present invention. Numeral 2 designates the hearth line on which material such as slabs or billets are moved from the charging end to the discharge end of the furnace, from left to right as viewed in Fig. 1 of the drawings. The arrows indicate the direction of flow of products of combustion from the firing zones which are established at intervals longitudinally of the furnace chamber. The numeral 3 designates the outlet passage of the products of combustion through the roof of the furnace which communicates with a recuperator chamber generally designated by the numeral 4.

The recuperator structure may be supported on the furnace binding or it may be supported on separate steel work and comprises the usual refractory walls 5 which are entirely steel encased as shown at 6 to prevent leakage of the hot gases common to current types of recuperators, and the bottom wall of the recuperator chamber is provided with baffles generally designated by the numeral 7 in the path of the gases passing from the furnace outlet to a stack designated by the numeral 8. The stack is provided with a Venturi outlet 9 connected to a blower establishing a forced draft whereby the velocity of the products of combustion drawn from the furnace through the recuperator chamber may be regulated.

The recuperator consists of a series of metal tubes 10 which are suspended by flanges 11 from the roof 12 of the recuperator chamber. A plurality of inner tubes 13 are disposed on the tubes 10 extending to substantially the bottom of the tubes 10 and are suspended by flanges 14 from partition walls 15. The top of the outer and inner tubes 10 and 13, respectively, are enclosed in header boxes 16 and 17 which are more clearly shown in Fig. 3 of the drawing. The header box 17 is provided with a duct 18 for supplying cold air from a fan or blower, not shown, and the header box 16 is provided with a hot air duct 19 from which preheated air is delivered to the furnace burners to commingle with the fuel delivered to the furnace chamber. As is also apparent from Figs. 2 and 3 of the drawings, there are double rows of tubes which are staggered so that the products of combustion passing from the furnace outlet 3 to the stack 8 travel a zig-zag path to provide maximum contact or wiping action with the recuperator tubes 10. The baffles 7 prevent the gases from taking a direct path beneath the recuperator tubes to the stack.

Peep holes 20 are provided in the recuperator wall for the insertion of soot blowers or other cleaning means and gates or openings 21 may be provided for accessibility and for cleaning the floor of the recuperator structure. In operation the cold air drawn through the duct 18 into header 17 passes downward through the inner tubes and then from the open bottom of the inner tubes into the annular space between the inner tube 13 and outer tube 10 and upward into the header box 16, from which the highly heated air passes through duct 19 to the furnace.

By placing the recuperator structure above the furnace instead of below as in conventional recuperative furnace construction, there is no down draft that would cause back pressure in the furnace chamber, and the natural draft or forced draft of the stack is available at the discharge end of the furnace to maintain efficient combustion and proper heat control of the slabs or billets passing along the furnace hearth 2.

The recuperator tubes 10 are accessible from the top of the recuperator and may be pulled vertically upward for replacement or repairs. One of the features of the invention is that the recuperator need not be cooled or shut down to make repairs to the tubes and the structure lends itself to ready cleaning to maintain the efficiency of the heat exchange tubes. Also the construction above the furnace provides unlimited space for recuperator area so that the maximum heat exchange is available for absorbing the heat from the hot products of combustion passing from the furnace to the stack. By the use of a fan for supplying cold air through the ducts 18 to the header 17 sufficient circulation of the cold air through the recuperator tubes is maintained to create a temperature differential that will prevent the burning out of the metal tubes which are preferably made of stainless steel. For example, assuming the temperature of the hot gases or products of combustion passing through the recuperator chamber 4 to be 2000° F. and the air circulating from the inner tube through the annulus and outer tube to the header 16 to be 1000° F. when delivered through the ducts 19, then the temperature of the tubes 10 would be less than 1500° F. This is because the velocity of the air blown through the inner tubes is much greater than the velocity of the gases passing from the furnace outlet 3 through the recuperator chamber to the stack 8.

It is evident from the above description of the invention that industrial heating furnaces having recuperator structures superimposed thereon provide an efficient and economical means of operating such furnaces with the maximum of preheat air temperatures assuring minimum loss of heat through the stack. It is further evident that said structures are readily accessible for cleaning and repairs and although one embodiment of the invention has been illustrated and described, it will be evident to those skilled in the art that various modifications may be made in the details of construction without departing from the principles herein set forth.

I claim:

1. In an industrial heating furnace, a relatively long heating chamber having a charging and a discharge opening at the respective ends thereof, a waste gas flue extending parallel to said chamber connected at the charging end of said chamber and having an exhaust stack at the other end thereof, said flue constituting a chamber for receiving banks of freely suspended heat exchange tubes and banks of such tubes so disposed in said flues in the path of the waste gas flow from the heating chamber to the stack, said banks of tubes consisting of transverse rows of tubes with the tubes in adjacent rows in staggered relation.

2. In an industrial heating furnace, a relatively long heating chamber having a charging and discharging opening at the respective ends thereof, a waste gas flue extending parallel to said chamber connected at the charging end of said chamber and having an exhaust stack at the other end thereof, said flue constituting a chamber for receiving banks of freely suspended heat exchange tubes and banks of such tubes so disposed in said flues in the path of the waste gas flow from the heating chamber to the stack, said banks of tubes consisting of transverse rows of tubes with the tubes in adjacent rows in staggered relation, the free ends of said suspended tubes being spaced from the bottom of said flue and baffle members extending from the bottom of the flue beyond the lower ends of the tubes to prevent stratification of the gas flow at the bottom of the flue.

3. In an industrial heating furnace, a relatively long heating chamber having a charging and a discharge opening at the respective ends thereof, a waste gas flue extending parallel to said chamber above the heating chamber having one end communicating with said chamber adjacent the charging end thereof and having a waste stack at the other end of said flue whereby the products of combustion flow in opposite directions in the heating chamber and flue to provide an uninterrupted natural upward flow of flue gases to the stack, said flue constituting a chamber for receiving banks of freely suspended heat exchange tubes and banks of such tubes so disposed in said flues in the path of the waste gas flow from the heating chamber to the stack, said banks of tubes consisting of transverse rows of tubes with the tubes in adjacent rows in staggered relation.

FRANK D. HAZEN.

References Cited in the file of this patent

UNITED STATES PATENTS

| Number | Name | Date |
| --- | --- | --- |
| 1,537,016 | Kroyer | May 5, 1925 |
| 1,716,956 | Hepburn et al. | June 11, 1929 |
| 1,751,136 | Dovel | Mar. 18, 1930 |
| 2,349,439 | Koppers | May 23, 1944 |

FOREIGN PATENTS

| Number | Country | Date |
| --- | --- | --- |
| 93,417 | France | Dec. 1, 1871 |
| 129,576 | France | Mar. 13, 1879 |